2 Sheets—Sheet 1.

B. & B. C. LAUTH.
Skelp-Bending and Scarfing-Machine.

No. 216,869. Patented June 24, 1879.

Witnesses
Inventors
Bernard Lauth
and
Bernard C. Lauth
by their Attorneys
Howson and Son 2 Sheets—Sheet 2.
B. & B. C. LAUTH.
Skelp-Bending and Scarfing-Machine.
No. 216,869. Patented June 24, 1879.
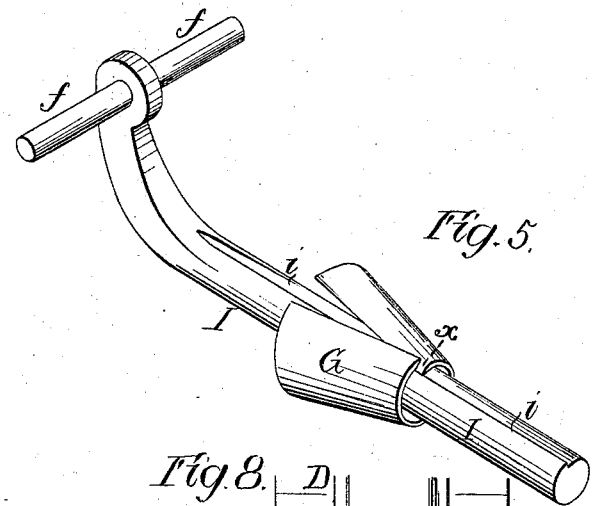
Fig. 5.
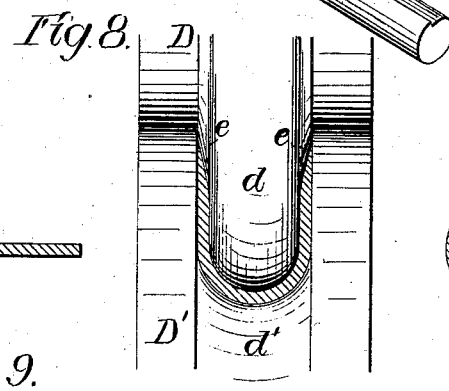
Fig. 8.
Fig. 7.
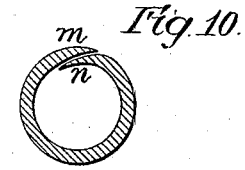
Fig. 10.
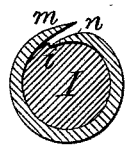
Fig. 9.
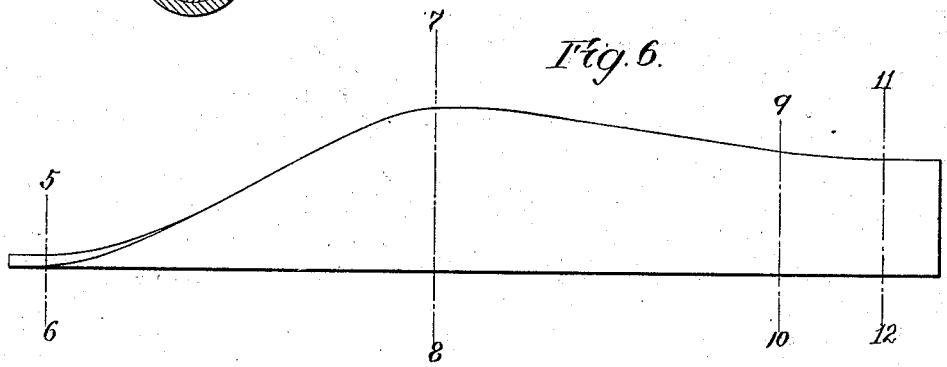
Fig. 6.
Witnesses
P. M. Deemer
Harry Smith
Inventors
Bernard Lauth
and
Bernard C. Lauth
by their Attorneys
Howson and Son

UNITED STATES PATENT OFFICE.

BERNARD LAUTH, OF HOWARD, AND BERNARD C. LAUTH, OF PITTSBURG, PENNSYLVANIA.

IMPROVEMENT IN SKELP BENDING AND SCARFING MACHINES.

Specification forming part of Letters Patent No. 216,869, dated June 24, 1879; application filed February 11, 1879.

*To all whom it may concern:*

Be it known that we, BERNARD LAUTH, of Howard, Centre county, Pennsylvania, and BERNARD C. LAUTH, of Pittsburg, Pennsylvania, have invented a new and useful Improvement in Skelp Bending and Scarfing Machines, of which the following is a specification.

Our invention relates to improvements in machinery for scarfing and bending strips of wrought-iron, commonly termed "skelps," and converting them into tubular form preparatory to welding; and the object of our invention is to so construct the machine as to bend and scarf the skelp to complete the bending of the skelp to a tubular form, and to cause one scarfed edge to properly overlap the other with regularity from end to end. This object we attain in the following manner, reference being had to the accompanying drawings, in which—

Figure 1:
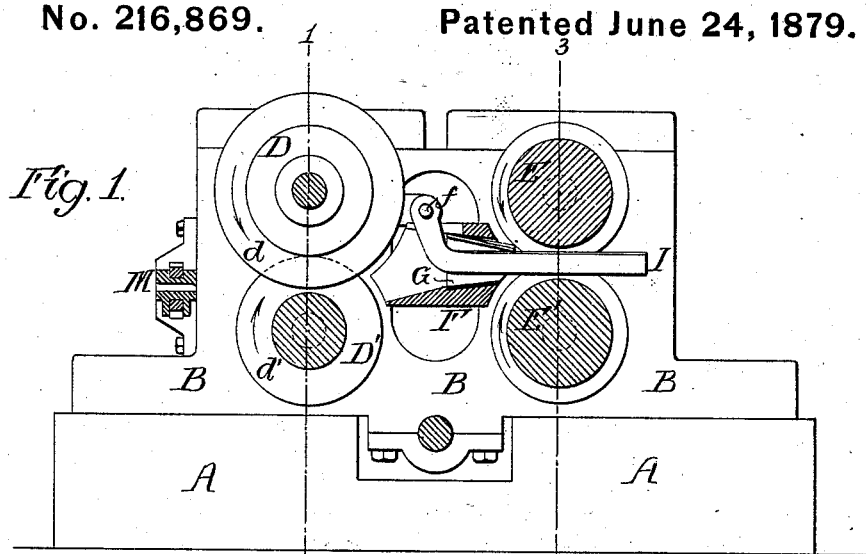
Figure 2:
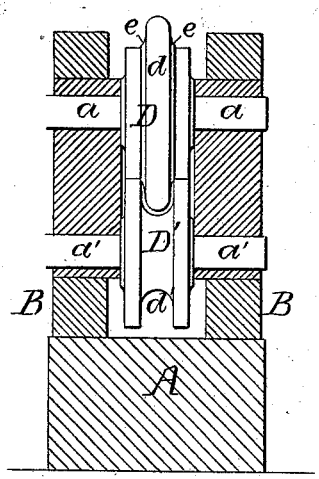
Figure 3:
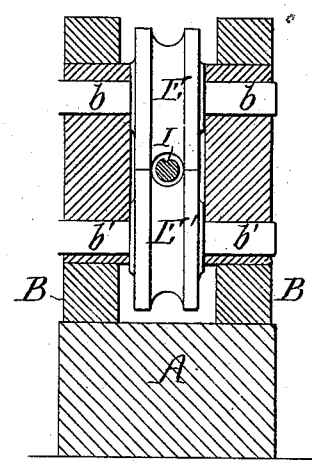
Figure 4:
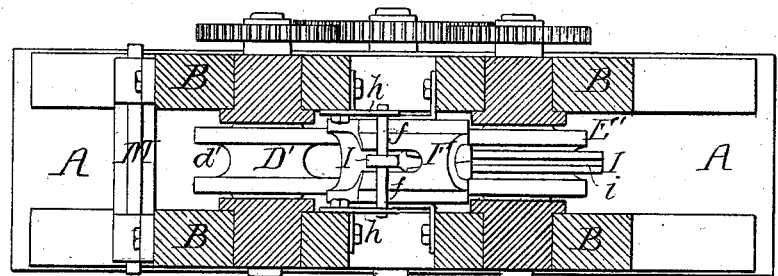

Figure 1, Sheet 1, is a vertical section of our improved skelp scarfing and bending machine; Fig. 2, a vertical section on the line 1 2; Fig. 3, a vertical section on the line 3 4; Fig. 4, a sectional plan in which the upper rolls are removed; Fig. 5, Sheet 2, a perspective view, illustrating part of the machine; Fig. 6, a side view of the skelp, illustrating the different conditions which it assumes in passing through the machine; Fig. 7, a transverse section of the skelp on the line 5 6, Fig. 6; Fig. 8, a transverse section on the line 7 8; Fig. 9, a transverse section on the line 9 10, and Fig. 10 a transverse section on the line 11 12.

The figures in Sheet 2 are drawn to a larger scale than those in Sheet 1.

A is the foundation, and B B are the opposite side frames, of the machine, and in these frames are fitted the bearing-blocks for the shafts $a\ a'$ of the rolls D D' and for the shafts $b\ b'$ of the rolls E E', these shafts being geared together, so that the several rolls shall revolve in the directions pointed out by the arrows in Fig. 1.

The roll D has a central annular tongue, $d$, the form of which will be best understood by reference to the enlarged view, Fig. 8, and the roll D' has a groove, $d'$, admitting the tongue of the upper roll, the relative forms of the tongue and groove being also best seen in Fig. 8, and being such that a flat bar of iron, Fig. 7, introduced between the rolls will be bent to the condition shown in the said Fig. 8, the ends of the turned-up sides of the bar being scarfed by the beveled portions $e\ e$ at the junction of the tongue $d$ with the body of the roll D. The rolls E E' are of the same diameter, each being so grooved that the pair will present a circular opening of the diameter to which the skelp has to be bent. (See Fig. 3.) Between the two pairs of rolls, and to the opposite side frames of the machine, is secured a casting, F, of the form shown in Fig. 1, and to the tubular rear portion of this casting is fitted the funnel-shaped piece G, preferably made of wrought-iron, and most clearly shown in Fig. 5. The contracted end of this funnel is not circular, one corner, $x$, being turned down toward the center, as shown in Fig. 5, for a purpose explained hereinafter. Through the funnel G, and between the rollers E E', passes the mandrel I, which is turned up at the rear end, and secured to the opposite frames B B by means of a transverse bar, $f$, and plates $h\ h$, one of the latter being attached to each frame, as shown in Fig. 4.

The mandrel I has a longitudinal depression, $i$, the form of which will be best understood by reference to Fig. 9, the turned-down corner $x$ of the funnel bearing firmly on the top edge of the depression.

A flat bar, Fig. 7, is submitted to the machine by first passing it through a guide, M, secured to the front ends of the frames B B. On passing between the first pair of rolls the bar is bent to the condition shown in Fig. 8, and at the same time the beveled portions $e\ e$ of the upper roll, D, bevel or scarf the upturned edges of the bent bar, as shown. On the bar being forced through the funnel G the upturned portions will be bent toward each other, and on passing through the contracted end of the funnel the corner $x$ of the same will force the scarfed edge $n$ into the longitudinal depression of the mandrel, as shown in Fig. 9, and when the bar passes between the grooved rolls E E' the latter will force the scarfed edge $m$ against, or nearly against, the scarfed edge n, which had previously been forced into the depression of the mandrel, so that the bar, which has now assumed a tubular form, will, on leaving the machine, be ready for the welding-furnace. (See Fig. 10.)

We do not desire to claim, broadly, rolls so formed that a strip passed between them will be simultaneously bent and scarfed; but

We claim as our invention—

1. The combination of the funnel G, having a turned-down corner, x, the mandrel I, having a longitudinal depression, i, and the rolls E E′, all as set forth.

2. The combination of the bending and scarfing rolls D D′, the funnel G, having a turned-down corner, x, the mandrel I, having a longitudinal depression, i, and the rolls E E′, all as specified.

In testimony whereof we have signed our names to this specification in the presence of two subscribing witnesses.

BERNARD LAUTH.
B. C. LAUTH.

Witnesses to the signature of Bernard Lauth:
GEORGE SPERRING,
JOHN N. LAUTH.

Witnesses to the signature of Bernard C. Lauth:
WILLIAM HOOPER,
HARRY SMITH.